United States Patent [19]
Calhoun et al.

[11] Patent Number: 5,197,236
[45] Date of Patent: Mar. 30, 1993

[54] WATERPROOF COVER FOR PILES OF BALES OF HAY AND THE LIKE

[76] Inventors: Leonard Calhoun, Box 453 - R.R. 2, Chesley, Ontario, Canada; Ivan W. Martin, R.D. 2 - Box 52, Millersburg, Pa. 17061

[21] Appl. No.: 820,799

[22] Filed: Jan. 15, 1992

[51] Int. Cl.⁵ .............................................. A01F 25/13
[52] U.S. Cl. ............................................... 52/4; 52/3
[58] Field of Search .................... 52/3, 4, 63, 83, 222; 206/83.5

[56] References Cited

U.S. PATENT DOCUMENTS

| | | |
|---|---|---|
| 1,293,451 | 2/1919 | Irvin . |
| 2,635,562 | 4/1953 | Abramson ................................ 52/3 |
| 3,184,764 | 5/1965 | West . |
| 4,221,085 | 9/1980 | Conaghan . |
| 4,248,343 | 2/1981 | Schaeffer . |
| 4,257,200 | 3/1981 | Hensley et al. ........................... 52/4 |
| 4,590,715 | 5/1986 | Pandell . |
| 4,712,672 | 12/1987 | Roy et al. . |
| 4,869,363 | 9/1989 | Goldberg .............................. 206/83.5 |

FOREIGN PATENT DOCUMENTS

| | | | |
|---|---|---|---|
| 737553 | 12/1932 | France ....................................... 52/4 |
| 1366076 | 9/1974 | United Kingdom ..................... 52/3 |

*Primary Examiner*—Michael Safavi
*Attorney, Agent, or Firm*—C. Hercus Just

[57] ABSTRACT

A waterproof cover for a multiple bale stack of forage material arranged in a peaked pile of bales, the cover having opposite edges provided with hems having spaced notch-like openings therein along the edges of the hems which respectively receive a series of rods in longitudinally-spaced position in the hems, a series of U-shaped members connected at the ends thereof respectively to the rods with the rounded ends of the members projecting through the notch-like openings, a series of parallel tie strands disposable beneath the stack of bales in alignment with the U-shaped members on the rods in the hems, and the opposite ends of the tie strands being connectable respectively to the U-shaped members to secure the cover to the top and sides of the stack of bales.

9 Claims, 2 Drawing Sheets

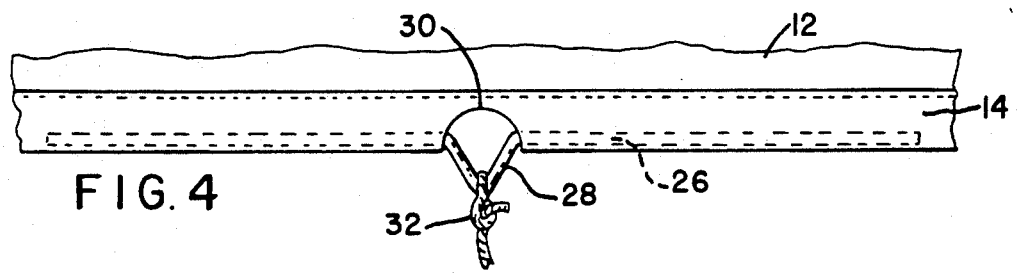
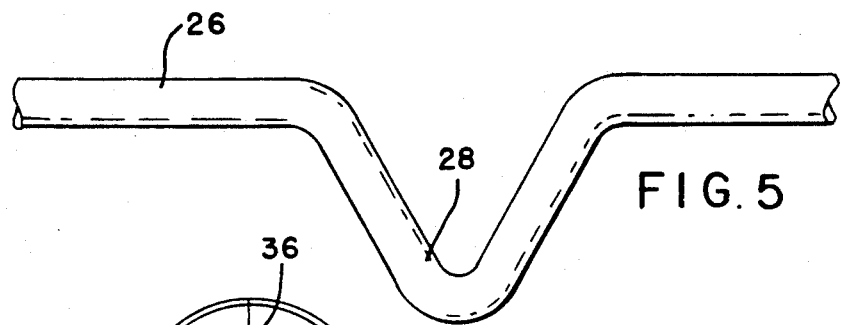
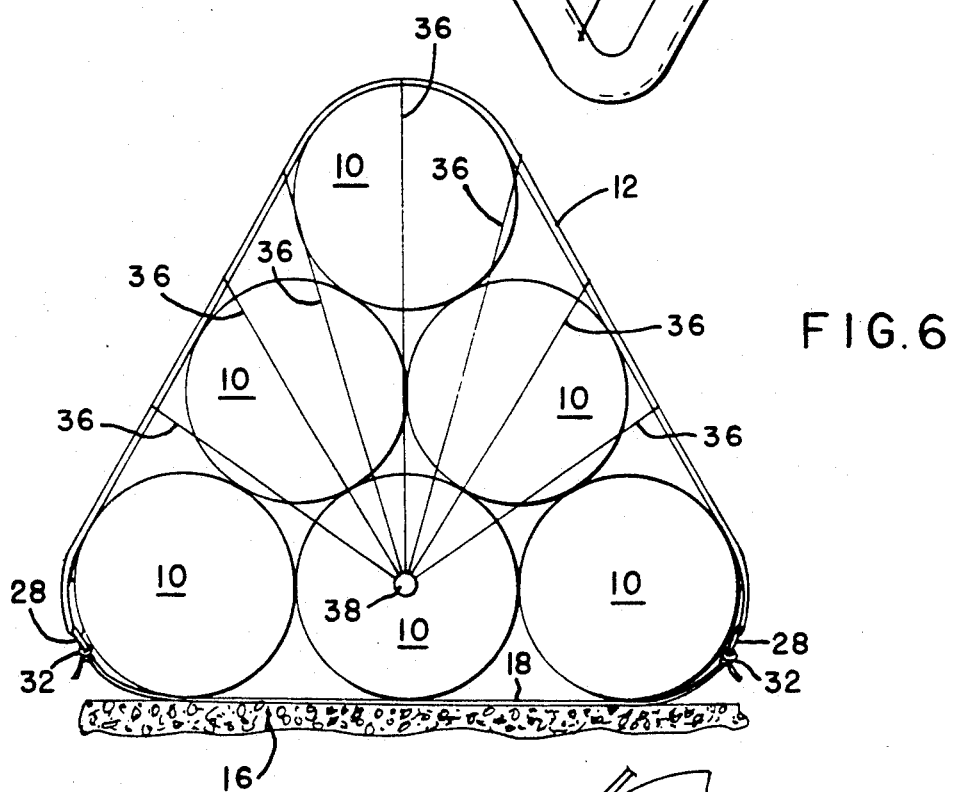
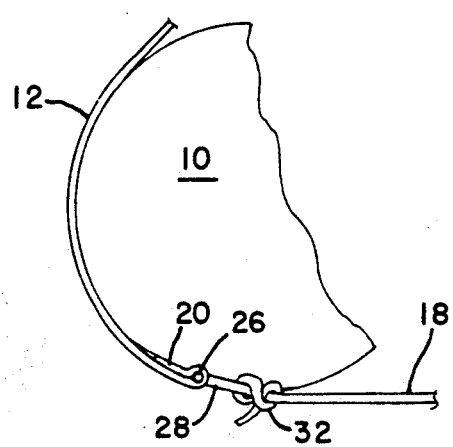

WATERPROOF COVER FOR PILES OF BALES OF HAY AND THE LIKE

LIST OF THE PRIOR ART

U.S. Pat. No. 1,293,451—Irvin, 1919
U.S. Pat. No. 3,184,764—West, 1965
U.S. Pat. No. 4,221,085—Conaghan, 1980
U.S. Pat. No. 4,248,343—Schaeffer, 1981
U.S. Pat. No. 4,590,715—Pandell, 1986
U.S. Pat. No. 4,712,672—Roy et al, 1987

BRIEF DESCRIPTION OF THE PRIOR ART

The patent to Irvin, U.S. Pat. No. 1,293,451, pertains to a mesh-like cover for shipping cotton and includes rods along opposite edges of the cover which have spaced notches engaged by hooks on the opposite ends of cross-links.

The patent to Conaghan, U.S. Pat. No. 4,221,085, discloses a cover for a single bale having opposite edges provided with hems through which grommets are located to receive the opposite ends of tie ropes to secure the cover to the bale.

The patent to West describes a swimming pool cover that has a series of short ropes connected at spaced locations to a rod or tube located in a hem of the cover and the outer ends of the ropes are secured to stakes in the ground area around the pool.

U.S. Pat. No. 4,248,343 to Schaeffer is somewhat similar to Conaghan in that it shows a cover for a single roll-type bale. The cover only extends across the top half of the bale and is secured by the opposite ends of a series of ropes that pass under the bale and up to the edges of the cover, where the ends of the ropes are secured to the cover by a type of skewer. Means are also shown to tie the cover to the ends of the bale.

U.S. Pat. No. 4,590,715 to Pandell pertains to a tarpaulin having hems on all edges and a continuous tie-down line extends within the hems, the latter having spaced notches where the line is accessible for "any tie down device" engage it.

U.S. Pat. No. 4,712,672 to Roy et al covers a single bale type cover which is shaped at the top complementarily to the upper half of the bale and the sides drape straight down to the supporting surface and are gathered in toward the bale by a tie rope extending around said sides.

BACKGROUND OF THE INVENTION

This invention pertains to protect bales of hay that have been harvested from the weather, and especially moisture, so that the bales, whether round or rectangular may be stored in a field, such as one from which they have been harvested, or otherwise. Preferably a relatively level area is selected for the storage and, in accordance with the invention, a crushed stone bed of limited thickness, such as three or four inches, is prepared to afford good drainage.

At present, it is quite common practice to harvest hay by cutting and permitting it to dry, followed by baling it with modern types of balers that wind a windrow of it into coiled-type bales. Currently, it is not uncommon for bales of this type to weigh as much as 1200 to 1500 lbs. Field-type storage of such bales therefore is highly appropriate. Protection against deterioration while stored in a field, however, is highly desirable and the principal objective of the present invention is to maximize the preservation of the baled hay for animal consumption, such as by preserving the hay against deterioration such as caused by the moisture of inclement weather and heat from the sun.

SUMMARY OF THE INVENTION

It is among the principal objects of the invention to provide a cover, preferably of substantial area, that is relatively light in weight, durable and adequate to shed water to render the hay waterproof, and of a color that results in the rays of the sun being deflected in an effort to spare the hay from being unduly heated by the rays of the sun, whereby the bales of hay may be stored outdoors in a field.

Another object of the invention is to provide improved means for attaching the cover to a longitudinally-peaked arrangement of bales of hay, either round or rectangular types of bales, so as to protect the top and sides of the pile in a maximum manner against all kinds of weather, by the use of novel and efficient attaching means in the hem along opposite side edges of the cover to which the opposite ends of tie strands that pass under the pile of bales at spaced parallel position and extend up to the side edges of the cover for ready attachment thereto.

It is still another object of the invention to so construct the aforementioned attaching means in a manner that the cover may start to be removed from one end of the pile of bales and, over a period of time, progressively remove the cover toward the opposite end of the pile while that portion of the cover which is still in protective place on the pile remains undisturbed.

This foregoing object of the invention is achieved by inserting, in longitudinally-spaced relationship within the hems of the cover on opposite edges thereof, a series of similar stiff elongated rod members which each have intermediate of the opposite ends thereof, a somewhat elongated U-shaped member which is attached at the ends thereof firmly to said rod member. Said U-shaped members extend through a notch-like opening in the hem of the cover to which one end of a tie strand, such as a rope of suitable strength and diameter, which passes under the bales of hay, has the ends of said strand passing through the U-shaped member and knotted for attachment thereto, thereby effectively securing the side ends of the cover effectively to the top and opposite sides of said pile of bales. As bales are removed from one end of the pile thereof, the part of the cover that was over said removed bales can be folded over the remaining secured part of the cover.

One further object of the invention is to form in the opposite end edges of the cover, which are perpendicular to the edges which contain the rod members, a series of spaced eyelet grommets which are conveniently located to have one end of a tie strand to be tied to each grommet and the other end of the strand is tied to a projection inserted into one of the lower bales in the center of the pile and thus prevent the grommetted end of the cover from being blown from its position shielding the adjacent end of the pile of bales.

Still another object of the invention is to have a light color on the outer surface of the cover which is adapted to reflect the heat of the sun and thus aid in preventing the interior of the bales beneath the cover from becoming over-heated.

Details of the foregoing objects and other objects thereof are set forth in the following detailed descrip-

BRIEF DESCRIPTION OF THE DRAWINGS

FIG. 4 is a fragmentary view showing details of the connection means for the cover to tie strands.

FIG. 5 is a fragmentary detail of the connecting member of FIG. 4.

FIG. 6 is an enlarged end view of the pile of bales and cover similar to FIG. 1, but on a larger scale.

FIG. 7 is a fragmentary detail of the connection means of the tie strand to the edge of the cover.

DETAILED DESCRIPTION OF THE PREFERRED EMBODIMENTS OF THE INVENTION

It is the initial and main object of the present invention to cover a peaked pile of either round or rectangular bales of forage material, such as hay and straw, with a waterproof cover that extends down the sides of the pile and is secured in operative position thereon in such a manner that when it is desired to remove the bales from the pile, starting at one end, the corresponding end of the cover may be folded backward onto the remaining portion of the cover due to the unique securing means for the opposite edges of the cover being so constructed that normally the lower edges of the cover are stiff, but when the uncovering operation is desired, such folding is possible, as described in detail hereinafter.

Figure 1:
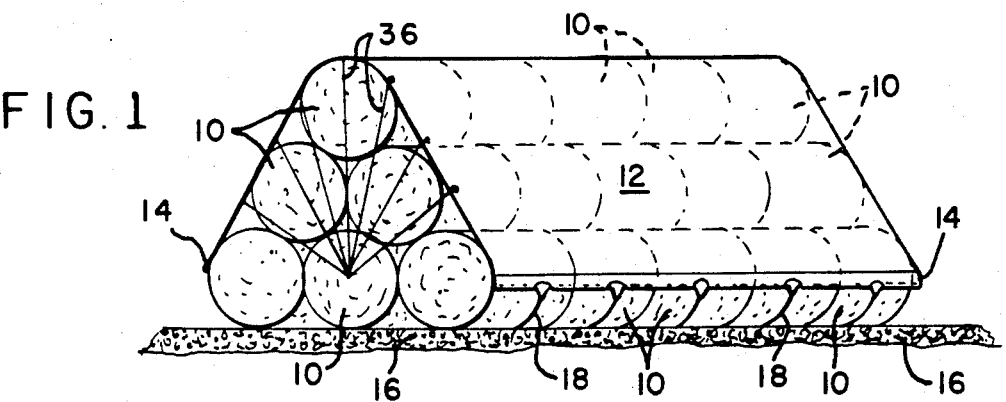
FIG. 1 is a perspective view of a pile of bales of hay beneath a cover embodying the invention.

Referring to FIG. 1, it will be seen that a generally triangular formation of a pile of round bales 10 of forage material is covered with a flexible, waterproof cover 12, which is provided at the opposite parallel edges of the cover with a hem 14. Although the bales 10 in FIG. 1 are shown arranged in a triangular shape, it is to be understood that the bales may be of a conventional rectangular shape and piled so as the pile has sloping sides, which, when the cover 12 is applied thereto, inclement weather material, such as rain or snow, readily may be shed from the pile. In view of the fact that bales of hay, for example, such as the bales 10 in FIG. 1, according to modern practice, readily may amount to 1200 or 1500 pounds and handling bales of that weight is difficult when endeavoring to store the same in a building. Accordingly, outdoor storage of such bales now is commonly undertaken in open fields, preferably reasonably level.

For purposes of enhancing the preservation of the forage material in the bales while stored in the manner described above, it is good practice to select a relatively level area of a field and provide upon the selected site, a layer 16 of crushed stone of the order of three or four inches in depth and upon which the lowermost layer of bales is disposed. After the site for the pile of bales has been prepared with the layer 16, the next operation is to dispose tie strands 18 upon the prepared surface 16 in transversely-spaced relationship, the distances between the strands being approximately the length of each of the bales, it being understood that a plurality of vertical rows of the bales are disposed in abutting relationship with each other to form an elongated pile of such abutting rows, as illustrated in dotted lines in FIG. 1. The tie strands may be of any suitable type of strands of tensile material, such as rope made from resinous material, such as sold under the trademark NYLON, of suitable diameter, but other appropriate material likewise may be employed. The length of said strands preferably should be such that it extends beneath all of the lowermost layer of bales 10 and preferably so that it extends at least part way up the side surfaces of the bales, for purposes to be described.

The cover 12, which is preferably rectangular in shape, is disposed over the pile of bales in a manner as illustrated in FIGS. 1 and 6, the length of the cover between opposite edges thereof should be adequate to extend at least part way down the outer surfaces of the lower, outermost bales for attachment to the ends of the tie strands 18.

Figure 3:
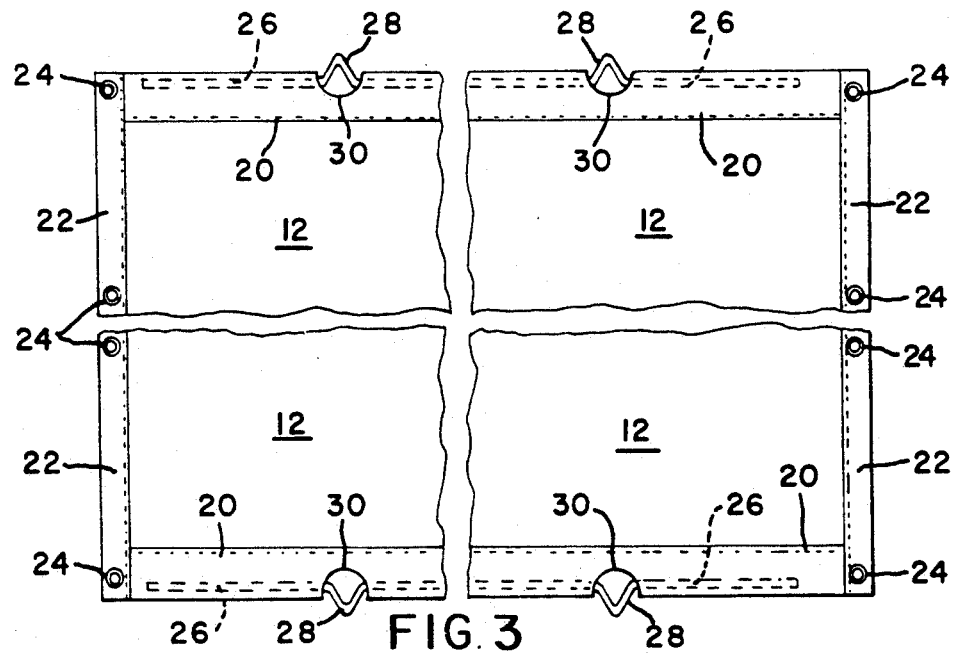
FIG. 3 is a fragmented foreshortened view of the bale cover shown in FIGS. 1 and 2 on a larger scale than in FIGS. 1-2.

Referring now to FIGS. 3–5, it will be seen that the opposite edges of the cover 12, which are the upper and lower edges in FIG. 3, are provided with continuous hems 20 which, considering, for example, that the cover 10 may be as much as 36 feet long between the hems 20, may be of the order between 5 inches and 8 inches in depth. The opposite ends of the cover 12 also are provided with hems 22 and spaced rows of eyelet grommets 24 are formed within the hems 22, as clearly shown in FIG. 3. Stiff sections of rods or segment members 26 of uniform, predetermined lengths are disposed within the relatively deep hems 14 in the opposite edges of the cover 12, and intermediately of the ends of the segment members, a U-shaped attaching member 28 is formed in each member 26, such as by bending the rod to form the member 28 on the member 26. It will be seen especially from FIGS. 4 and 5 that the member 28 is of slightly less length than the depth of the hem 14, in order that the members 26 with the members 28 attached thereto may slidably be moved within the hem 14, in order that a series of the members 26 may be arranged in longitudinally-spaced relationship along said hems and thus, enable the members 28 to project through the arcuate openings 30 which serves to relatively permanently locate each of the members 26 in longitudinally-spaced relationship with the hem 14, preferably when employed in a cover of the order of about 36 feet in length. It has been found that members 26 may be of the order of approximately 2 ½ feet in length. This is suitable to afford stiffness to the edges of the cover in which they are disposed, especially when more or less conventional bales of the order of four feet in diameter and also four feet in length are proposed to be covered. Such indication of diameter and length of the bales, however, is not considered to be restrictive but merely illustrative. In addition, by way of example, the segment members 26 preferably are selected from metal stock, either tubular or rod, and ¾ inch in diameter, more or less. Also, by virtue of the projection of the U-shaped members 28 through the openings 30, the respective longitudinal series of members 26 in the hems 14 are accurately maintained in the desired spaced relationship.

Referring to fragmentary view of FIG. 7, the same is intended to illustrate the manner in which the ends of the tie strands 18 are extended through the U-shaped attaching members 28 and pulled taut to secure the cover in desired position upon the pile of bales and the ends of the tie strands 18 then are tied in an appropriate knot 32.

Figure 2:
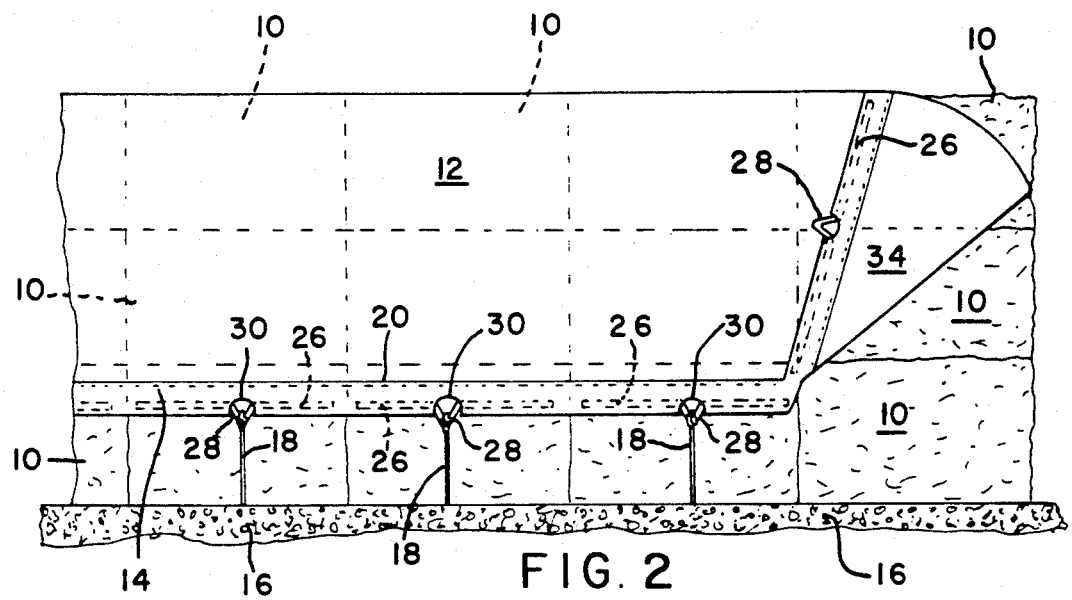
FIG. 2 is a fragmentary section on an enlarged scale version of a portion of the side of the view in FIG. 1.

Referring to FIG. 2, at the right-hand end, a corner portion 34 of the cover 12 is shown in partially elevated position to expose the bales 10 that are at one end of the complete pile thereof and from which they readily may be removed. After removal of however many of bales are desired, that end of the cover 12 then is drawn down, appropriately, to cover the exposed end of the remaining piled bales, which meanwhile, have not been disturbed.

The purpose of the eyelet grommets 24, which are in opposite ends of the cover 12, which are perpendicular to the hem 20 thereon, is to permit the opposite edges of the cover 12 which are adjacent the endmost bales in the pile shown in FIG. 1, to be secured, especially over the outer surfaces of the outermost vertical row of bales 12. This is accomplished in very simple manner by employing a series of additional tie strands 36 which are secured at one end through the eyelet grommets 24 and the opposite ends of all of the tie strands 36 are secured to an appropriate large spike 38, or other suitable member which is forced into more or less the center of the middle bale 10 in the lower row thereof, as viewed in FIG. 6.

By way of example, the cover 12 preferably is made of relatively light weight sheet of woven polyethylene fabric having a UV inhibitor incorporated therein and rendered waterproof by the application of a waterproof coating of suitable type impregnated therein. The rod segments 26 and the U-shaped attaching member 28 preferably are formed from steel, either solid rod or tube stock and are adequately coated with suitable rust-proof paint.

From the foregoing, it will be seen that the present invention provides a readily manipulated cover for a pile of bales of forage material which preferably are arranged in peaked manner in order to provide stable maintenance of a waterproof cover upon a pile of bales until the use thereof is desired. Then, the means for securing one end of the cover then may be folded back upon the stabilized remaining portion of the cover, thereby exposing the bales which are desired for use. Upon the removal of the bales which are needed, the cover then may be restored to covered relationship with that end of the pile of bales from which some have been removed and the then excess end of the cover may be drawn tight into suitable position by use of the additional tie strands 36 and large spike 38.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A waterproof bale cover for covering and maintaining piled bales of forage material of predetermined size relatively free from contact by weather elements when piled on a field surface, said cover being commensurate in size with a generally peaked arrangement of a plurality of bales and covering the uppermost portion and opposite sides of said arrangement of bales and said cover comprising a generally rectangular or square sheet of flexible waterproof material, a pair of opposite edges of said sheet material each being formed with a hem of adequate width to receive in longitudinally-spaced relationship a series of segment members of stiff rod-like material which are disposed in a spaced longitudinal series within said hem, each of said members having midway of the ends thereof a U-shaped attaching member, each of said members projecting through one of a series of openings in said hem and said U-shaped members being adapted to be connected to the opposite ends of a tie strand disposed beneath and anchored relative to said pile of bales by the weight thereof upon said strand.

2. The bale cover according to claim 1 further characterized by said tie strand comprising a rope-like member disposed transversely beneath the lowermost row of bales in said pile whereby the weight of said bales securely anchors said rope-like member relative to the field surface upon which said pile of bales is disposed.

3. The bale cover according to claim 1 further including a relatively even layer of crushed rock of limited thickness disposed upon a field beneath said pile of bales.

4. The bale cover according to claim 1 further characterized by the opposite end edges of said cover which are transverse to said hems also comprising hems of limited width and a series of spaced eyelet grommets being provided therealong and adapted to have one end of strands of rope-like members secured thereto and the other ends of said members being affixed to anchor means projecting from the outermost end surface of a selected bale in said pile thereof to secure the grommeted ends of said cover relative the ends of said pile of bales.

5. The bale cover according to claim 1 further characterized by said cover comprising a sheet of woven polyethylene fabric having a UV inhibitor therein and rendered waterproof by the application of a waterproof coating impregnated thereinto.

6. The bale cover according to claim 1 further characterized by the outermost surface of said cover, when in use, being light in color and adapted to reflect the heat of the sun when exposed thereto.

7. The bale cover according to claim 1 in which said rod-like members and the U-shaped attaching members are formed from steel and are coated with rust-proofing material to prevent rusting.

8. A flexible waterproof cover for a pile of bales of forage material arranged in a peaked pile adapted for support upon a relatively flat ground surface and said pile being composed of a series of such piles in end-to-end abutting relationship, said cover comprising a generally rectangular sheet of waterproof material and having an area adequate to cover the top and sloping side surfaces of such pile of bales and having a hem along opposite side edges of said sheet within which a series of stiff segments of rod-like material are contained in longitudinally-spaced relationship to each other, said sections of rod-like material respectively having approximately midway of the length thereof a U-shaped attaching member preferably formed therein by bending each segment of the material, said hems being provided with openings spaced similarly to said attaching members on said segments and through which said attaching members project for connection of the ends of tie strands thereto, and said tie strands otherwise being stabilized relative to the ground surface adjacent said pile of bales to maintain said cover in stable overlying relationship to said pile of bales and the spaced relationship of said stiff segments of rod-like material permits the folding of the end of said cover upon the remainder of the cover as bales at one end of the pile are removed.

9. The waterproof cover according to claim 8 in which said tie strands are adapted to be disposed in spaced parallel relationship to each other beneath the lowermost bales in said pile thereof, whereby the weight of said pile of bales upon said tie strands maintains the same in fixed position.

* * * * *